US009229862B2

(12) United States Patent
Chandrakar et al.

(10) Patent No.: US 9,229,862 B2
(45) Date of Patent: *Jan. 5, 2016

(54) CACHE MANAGEMENT BASED ON PHYSICAL MEMORY DEVICE CHARACTERISTICS

(71) Applicant: International Business Machines Corporation, Armonk, NY (US)

(72) Inventors: Rahul Chandrakar, Bangalore (IN); Venkatesh Sainath, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,253

(22) Filed: Feb. 11, 2013

(65) Prior Publication Data

US 2014/0115226 A1 Apr. 24, 2014

Related U.S. Application Data

(63) Continuation of application No. 13/654,736, filed on Oct. 18, 2012.

(51) Int. Cl.
*G06F 12/08* (2006.01)
*G06F 12/10* (2006.01)
*G06F 12/12* (2006.01)

(52) U.S. Cl.
CPC ........ *G06F 12/0802* (2013.01); *G06F 12/1027* (2013.01); *G06F 12/121* (2013.01); *G06F 2212/205* (2013.01)

(58) Field of Classification Search
CPC ....................................................... G06F 12/12
USPC ......... 711/103, 105, 147, 162, 166, 170, 202, 711/E12
See application file for complete search history.

(56) References Cited

U.S. PATENT DOCUMENTS

| | | | |
|---|---|---|---|
| 5,455,951 A * | 10/1995 | Bolton et al. ................. | 718/103 |
| 6,349,363 B2 * | 2/2002 | Cai et al. ....................... | 711/129 |
| 6,766,419 B1 | 7/2004 | Zahir et al. | |
| 6,957,294 B1 * | 10/2005 | Saunders et al. ................. | 711/4 |
| 7,111,124 B2 * | 9/2006 | Iyer et al. ...................... | 711/129 |

(Continued)

OTHER PUBLICATIONS

Jalee et al. (High Performance Cache Replacement Using RRIP, 2010).*

(Continued)

*Primary Examiner* — Aimee Li
*Assistant Examiner* — Tracy Chan
(74) *Attorney, Agent, or Firm* — Yee & Associates, P.C.; Parashos Kalaitzis

(57) ABSTRACT

A processor unit removes, responsive to obtaining a new address, an entry from a memory of a type of memory based on a comparison of a performance of the type of memory to different performances, each of the different performances associated with a number of other types of memory.

6 Claims, 6 Drawing Sheets

(56) References Cited

U.S. PATENT DOCUMENTS

| | | | |
|---|---|---|---|
| 7,457,920 B1 | 11/2008 | Kornegay et al. | |
| 7,685,369 B2 | 3/2010 | van Riel | |
| 7,840,759 B2 | 11/2010 | Kornegay et al. | |
| 8,117,397 B2 | 2/2012 | Guthrie et al. | |
| 8,171,216 B2* | 5/2012 | Dawkins | 711/114 |
| 8,392,658 B2* | 3/2013 | Wang et al. | 711/128 |
| 2006/0041720 A1* | 2/2006 | Hu et al. | 711/136 |
| 2007/0186045 A1 | 8/2007 | Shannon et al. | |
| 2008/0071969 A1* | 3/2008 | Lin | 711/103 |
| 2008/0120469 A1 | 5/2008 | Kornegay et al. | |
| 2008/0235456 A1 | 9/2008 | Kornegay et al. | |
| 2008/0294846 A1* | 11/2008 | Bali et al. | 711/118 |
| 2009/0276607 A1* | 11/2009 | Bonola | 712/209 |
| 2011/0055482 A1 | 3/2011 | So et al. | |
| 2011/0296122 A1* | 12/2011 | Wu et al. | 711/156 |
| 2012/0011504 A1* | 1/2012 | Ahmad et al. | 718/1 |
| 2012/0117301 A1* | 5/2012 | Wingard | 711/6 |
| 2012/0311269 A1* | 12/2012 | Loh et al. | 711/133 |
| 2013/0046918 A1* | 2/2013 | Im | 711/103 |
| 2014/0013052 A1* | 1/2014 | Sawin et al. | 711/122 |
| 2014/0115225 A1 | 4/2014 | Chandrakar et al. | |

OTHER PUBLICATIONS

Wu, "Cache Management with Partitioning-Aware Eviction and Thread-Aware insertion/Promotion Policy," International Symposium on Parallel and Distributed Processing with Applications, IEEE Computer Society, Sep. 6-9, 2010, pp. 374-381.

Ou, et al., "A unified multiple-level cache for high performance storage systems," Proceedings of the 13th IEEE International Symposium on Modeling, Analysis, and Simulation of Computer and Telecommunication Systems (MASCOTS '05), 8 pages.

U.S. Appl. No. 13/654,736 filed Oct. 18, 2012, 35 pages.

Office action dated May 23, 2014, regarding U.S. Appl. No. 13/654,736, 30 pages.

Office action dated Oct. 10, 2014, regarding U.S. Appl. No. 13/654,736, 23 pages.

Office action dated Apr. 7, 2015, regarding U.S. Appl. No. 13/654,736, 45 pages.

Notice of Allowance, dated Aug. 26, 2015, regarding U.S. Appl. No. 13/654,736, 9 pages.

* cited by examiner

| START ADDRESS 310 | END ADDRESS 320 | MEMORY TYPE 330 | MEMORY READ SPEED 342 | MEMORY WRITE SPEED 350 |
|---|---|---|---|---|
| 0x000 312 | 0x0FF 322 | DRAM 332 | X1 BYTES/SEC 342 | Y1 BYTES/SEC 352 |
| 0x100 314 | 0x1FF 324 | PRAM 334 | X2 BYTES/SEC 344 | Y2 BYTES/SEC 354 |
| 0x200 316 | 0x2FF 326 | NOR FLASH 100 | X3 BYTES/SEC 346 | Y3 BYTES/SEC 356 |
| 0x300 318 | 3xFF 328 | NAND FLASH 338 | X4 BYTES/SEC 348 | Y4 BYTES/SEC 358 |

CACHE MANAGEMENT BASED ON PHYSICAL MEMORY DEVICE CHARACTERISTICS

This application is a continuation of U.S. patent application Ser. No. 13/654,736 filed Oct. 18, 2012, status pending.

BACKGROUND

1. Field

The disclosure relates generally to a computer implemented method, a computer program product, and a data processing system for cache management, and more specifically, to freeing space from caches based on characteristics of memory devices associated with data stored in the caches.

2. Description of the Related Art

Cache management involves removing data associated with selected physical addresses and selected virtual addresses from their respective caches by one or more algorithms. Such algorithms may be called removal algorithms because they remove data to make room for a new data to be stored in the cache. Removal algorithms may also be referred to as eviction algorithms.

A processor needing to access data corresponding to a physical address, checks a cache table for the physical address. If the cache table does not contain the physical address, then the physical address is obtained, another physical address in the cache table is selected for removal, the selected physical address is removed from the table, and the physical address is placed in the cache table.

When a processor needs to access data corresponding to a virtual address, the processor looks into a translation lookaside buffer (TLB) for the virtual address. If the TLB has an entry for the virtual address, the physical address is read from TLB and the corresponding cache line is read. A processor may have multi-level TLBs and multi-level caches.

If an entry for the virtual address is not found in the TLB, then the physical address is obtained from memory, another virtual address associated with another physical address is selected for removal from the TLB, the virtual address is removed from the TLB, and the virtual address associated with the physical address is placed in the TLB.

Caches may reside in many different types of memory devices. Each type of memory device may have different characteristics. Furthermore, each physical or virtual addresses stored in a cache table may be associated with data stored in one or more types of memory devices. Each type of memory device may have a set of characteristics that are different from other types of memory devices. One or more characteristics of a type of memory device may affect system speed. Therefore, selection of addresses for eviction from a cache table may affect system speed.

Currently, removal algorithms do not take into account the type of memory devices in which the cached physical or virtual address is stored when selecting a virtual address or a physical address to be removed from a cache table to make room for the requested physical address or virtual address. Nor do current eviction algorithms take into account the type of memory device containing the data associated with the physical or virtual address when selecting a virtual address or a physical address to be removed to make room for the requested physical address or virtual address.

Therefore, it would be beneficial to have a method, apparatus, and computer program product that takes into account at least some of the issues discussed above, as well as possibly other issues.

SUMMARY

In an illustrative embodiment, a processor unit removes, responsive to obtaining a new address, an entry from a memory of a type of memory based on a comparison of a performance of the type of memory to different performances, each of the different performances associated with a number of other types of memory.

BRIEF DESCRIPTION OF THE SEVERAL VIEWS OF THE DRAWINGS

FIG. 3 is a table of addresses, memory types, and characteristics of the memory types in which illustrative embodiments may be implemented;

DETAILED DESCRIPTION

Figure 1:
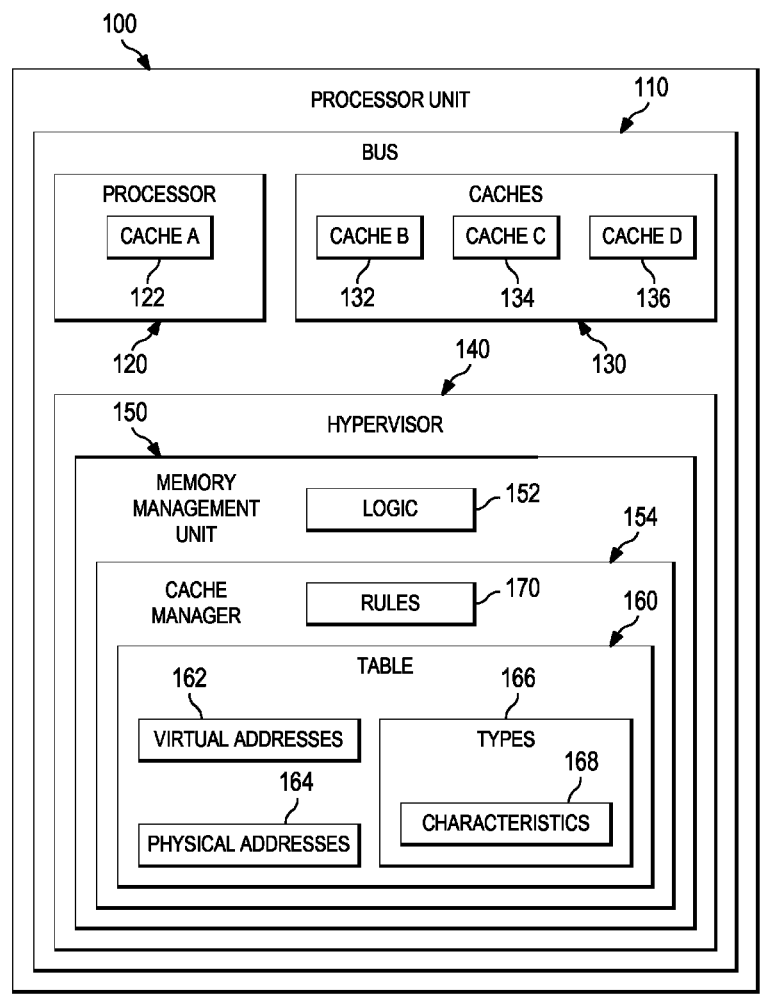
FIG. 1 is a block diagram of a processor unit in which illustrative embodiments may be implemented.

Referring to FIG. 1, a block diagram of a processor unit is depicted, which may be used in implementing embodiments of the invention. Processor unit 100 has bus 110 operably coupling processor 120, caches 130 and hypervisor 140. Hypervisor 140 may be virtual machine manager that allows multiple operating systems to share processor unit 100.

Processor 120 may have cache A 112. Caches 130 may comprise cache B 132, cache C 134, and cache D 136. Persons skilled in the art are aware that there may be any number of caches, and caches in FIG. 1 are by way of example and not by way of limitation. In addition, different devices may be used as caches and have caches as part of the device such as memory 206, persistent storage 208, flash 210, communications unit 212, input/output unit 214 and display 216 in FIG. 2.

Figure 2:
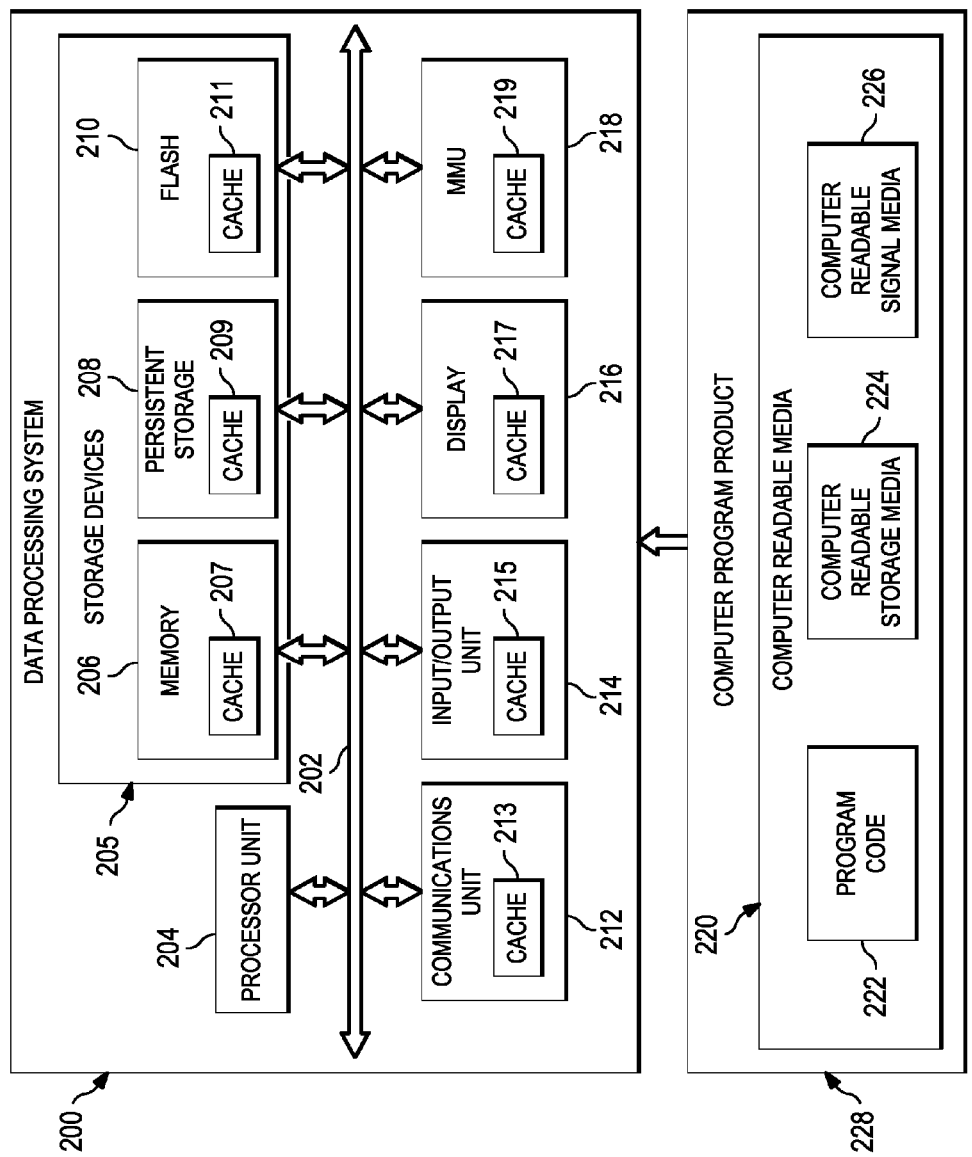
FIG. 2 is a block diagram of a data processing system in which illustrative embodiment may be implemented.

Hypervisor 140 may control processor unit 100 and resources such as cache A 122, cache B 132, cache C 134, cache D 136, in FIG. 1, memory 206, persistent storage 208, flash 210, communications unit 212, input/output unit 214 and display 216 in FIG. 2. Persons skilled in the art recognize and take into account that multiple resources may have different characteristics such as, for example, speed, buffered versus non-buffered, and none versus single bit versus multi bit error detection and correction. Hypervisor 140 may identify each of the foregoing resources, categorize each of the foregoing resources by type, and identify characteristics of each of the foregoing resources, and identify characteristics of each type of resources.

Hypervisor 140 may include memory management unit 150. Memory management unit 150 may include logic 152 and cache manager 154. In a system, any combination of resources may be chosen based on the requirements. Logic 152 may contain enhanced removal algorithms for removing entries in cache table such as table 160 in cache manager 154. Enhanced removal algorithms suitable for logic 152 may be removal algorithms modified by one or more of the processes of FIGS. 4 through 7 discussed below.

Persons skilled in the art recognize and take into account that there multiple algorithms suitable for modification by one or more of the processes of FIGS. 4 through 7. For example, a removal algorithm suitable for modification for use in logic 152 may be a Least Recently Used (LRU) algorithm. A LRU algorithm removes an address that is the least recently used among the addresses in table 160. A Least Frequently Used (LFU) algorithm may remove an address that is identified as the address least frequently used among the addresses in the cache.

In an illustrative embodiment, an LFU algorithm may maintain a counter for each address and remove the address which has the least counts. Upon introducing the memory characteristics as a parameter, the algorithm can maintain a count for addresses belonging to a memory type. These counts are maintained for the last "n" units of time. Persons skilled in the art recognize and take into account that the cache management algorithms can be adapted depending upon the characteristics of the various storage devices used. An LFU algorithm may be modified for logic 152 by one or more of the processes of FIGS. 4 through 7.

A First In First Out (FIFO) algorithm may remove an address that is identified as the first address to be stored in the cache. A FIFO algorithm may be modified for use in logic 152 by one or more of the processes of FIGS. 4 through 7. Another example of a removal algorithm may remove addresses based on a priority where the operating system can provide an address range and request the processor to lock the cache lines which are holding data in that address range. Such a removal algorithm may be modified by one or more of the processes of FIGS. 4 through 7 for use in logic 152.

Cache manager 154 may include table 160 and rules 170. Table 160 may be in the form of a row and column format table or a linked list. In an illustrative embodiment, table 300 in FIG. 3 may be table 160 in FIG. 1. When an address in table 300 is removed, the space associated with the address may be free to be written on. Alternatively, caches such as caches A 122 through cache D 136 and cache 207 through 217 may each have a number of addresses stored with the cache and connected by a linked list. When an address is removed from the linked list, the space in memory associated with the address is free to be written on. Persons skilled in the art recognize and take into account that alternate data structures may be suitable to perform the function of table 160. In an illustrative embodiment, table 160 may be a translation lookaside buffer (TLB). Persons skilled in the art recognize and take into account that a TLB may be a cache that memory management hardware, such as memory management unit 150 uses to improve virtual address translation speed. A TLB is typically implemented as a content-addressable memory (CAM). The CAM may have a search key that is a virtual address and a search result is the physical address corresponding to the virtual address. Table 160 may contain virtual addresses 162, physical addresses 164, types 166, and characteristics 168.

Persons skilled in the art recognize and take into account that when a requested address is present in the TLB, the CAM search yields a match and the retrieved physical address is used to access memory. When the requested address is not in the TLB, contents of multiple memory locations are read and used to compute the physical address. After the physical address is determined, the virtual address to physical address mapping is entered into the TLB.

Persons skilled in the art recognize and take into account that a TLB may have a fixed number of slots that contain page table entries, which map virtual addresses to physical addresses.

Persons skilled in the art recognize and take into account that a TLB may reference physical memory addresses in a table. A TLB may reside between the CPU and the CPU cache, between the CPU cache and primary storage memory, or between levels of a multi-level cache. Placement of a TLB may determine whether the cache uses physical or virtual addressing. If the cache is virtually addressed, requests may be sent directly from the CPU to the cache, and the TLB may be accessed only on a cache miss. If the cache is physically addressed, the CPU may perform a TLB lookup on every memory operation and the resulting physical address may be sent to the cache.

Referring to FIG. 2, a block diagram of a data processing system is depicted, which may be used in implementing embodiments of the invention. In this illustrative example, data processing system 200 includes communications fabric 202, which provides communications between processor unit 204, memory 206, persistent storage 208, flash memory 210, communications unit 212, input/output (I/O) unit 214, and display 216.

Storage devices 205 may include memory 206, persistent storage 208, and flash 210. A storage device is any piece of hardware that is capable of storing information, such as, for example, without limitation, data, program code in functional form, and/or other suitable information either on a temporary basis and/or a permanent basis. Storage devices 205 may also be referred to as computer-readable storage devices in these examples. Memory 206, in these examples, may be, for example, a random access memory or any other suitable volatile or non-volatile storage device. Persons skilled in the art recognize and take into account that memory 206 may be configured to have one or more caches such as cache B 132 through cache D 136, and additional caches such as cache 207.

Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. Persons skilled in the art recognize and take into account that persistent storage 208 may be configured to have one or more caches such as cache B 132 through cache D 136, and additional caches such as cache 209. Flash 210 may be NOR Flash or NAND Flash. Persons skilled in the art recognize and take into account that flash 210 may be configured to have one or more caches such as cache B 132 through cache D 136, and additional caches.

Communications unit 212, in these examples, provides for communications with other data processing systems or devices. In these examples, communications unit 212 is a network interface card. Communications unit 212 may provide communications through the use of either or both physical and wireless communications links. Persons skilled in the art recognize and take into account that communications unit 212 may be configured to have cache 213.

Input/output unit 214 allows for input and output of data with other devices that may be connected to data processing system 200. For example, input/output unit 214 may provide a connection for user input through a keyboard, a mouse, and/or some other suitable input device. Further, input/output unit 214 may send output to a printer. Persons skilled in the art recognize and take into account that input/output unit 214 may be configured to have cache 215. Display 216 provides a mechanism to display information to a user. Persons skilled in the art recognize and take into account that display 216 may be configured to have cache 217. Memory management unit 218 may be configured to have cache 219. Memory management unit 218 may be memory management unit 150 in FIG. 1.

Instructions for the operating system, applications, and/or programs may be located in storage devices 205, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or computer-readable storage media, such as memory 206 or persistent storage 208.

Program code 222 is located in a functional form on computer-readable media 220 that is selectively removable and may be loaded onto or transferred to data processing system 200 for execution by processor unit 204. Program code 222 and computer-readable media 220 form computer program product 228 in these examples. In one example, computer-readable media 220 may be computer-readable storage media 224.

Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200.

Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations. For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, program code 222 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 222. With this depicted example, some of the processes may be implemented in the number of hardware units, while other processes may be implemented in the number of processors.

As another example, a storage device in data processing system 200 is any hardware apparatus that may store data. Memory 206, persistent storage 208, Flash 210 and computer-readable media 220 are examples of storage devices in a tangible form. In another example, a bus system may be used to implement communications fabric 202 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter.

Further, a memory may be, for example, memory 206, or a cache, such as found in an interface and memory controller hub that may be present in communications fabric 202.

Referring to FIG. 3, a table of addresses, memory types, and characteristics of the memory types is depicted in which illustrative embodiments may be implemented. Table 300 may include addresses indicated by start addresses 310 and end addresses 320.

Table 300 may include a column indicating memory types 330. Table 300 may include characteristic columns such as memory read speed 340 and memory write speed 350. Types of memory devices may include, by way of example and not by way of limitation, dynamic random access memory (DRAM), static random access memory (SRAM), phase change memory (PRAM), embedded dynamic random access memory (eDRAM), electrically erasable programmable read-only memory (EEPROM), NOR flash memory, and NAND flash memory.

In an illustrative embodiment, table 300 has a start address 310 of 0x000 312, an end address 320 of 0x0FF 322, a memory type 330 of DRAM 332, a memory read speed 340 of X1 bytes/sec 342 and a memory write speed 350 of Y1 bytes/sec 352. Row 302 has start address 310 of Xx100 314, an end address 320 of 0x1FF 324, a memory type 330 of PRAM 334, a memory read speed 340 of X2 bytes/sec 344 and a memory write speed 350 of Y2 bytes/sec 354.

Row 303 has a start address 310 of 0x200 316, an end address 320 of 0x2FF 326, a memory type 330 of NOR FLASH 336, a memory speed 340 of X3 bytes/sec 346, and a memory write speed 350 of Y3 bytes/sec 356. Row 304 has a start address 310 of 0x300 318, an end address 320 of 0x3FF 328, a memory type 330 of NAND FLASH 338, a memory read speed 340 of x4 bytes/sec 348, and a memory write speed 350 of Y4 bytes/sec 358.

Figure 4:
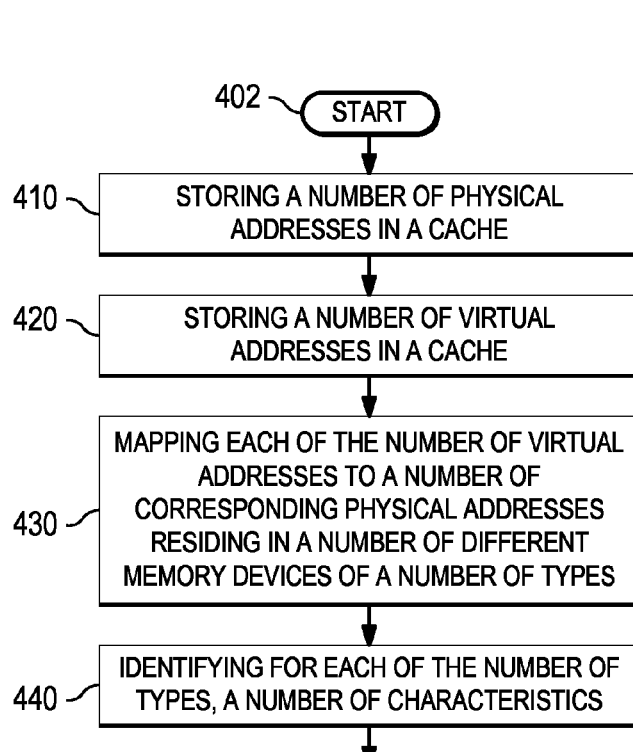
FIG. 4 is a flow chart of a hypervisor and memory management unit process in which illustrative embodiments may be implemented.

Referring to FIG. 4, a flow chart of a hypervisor and memory management unit process is depicted in which illustrative embodiments may be implemented. Process 400 starts (402) and stores a number of physical addresses in a cache table (410). Process 400 stores a number of virtual addresses in a cache table (420). Process 400 maps each of the number of virtual addresses to a number of corresponding physical addresses residing in a number of different memory devices of a number of types (430). Mapping may be entered in a cache table such as table 160 in FIG. 1.

Virtual addresses may be entered in virtual addresses 162 in FIG. 1 and mapped to physical addresses 164 in FIG. 1. Process 400 identifies for each of the number of types, a number of characteristics (440). In an illustrative embodiment, a hypervisor such a hypervisor 140 in FIG. 1 may identify the different memory devices available in the system and their characteristics in process 400. The different memory devices may be cache A 122, cache B 132, cache C 134, and cache D 136 in FIG. 1.

In addition, the different memory devices to be identified may be memories such as memory 206, persistent storage 208, flash 210, communications unit 212, input/output unit 214 and display 216 in FIG. 2. Types of memory such as the types identified above, may be entered in types 166 and the characteristics of each type may be entered in characteristics 168 in FIG. 1. Characteristics that may be entered in characteristics 168 in FIG. 1 may include without limitation address range, memory read speed, and memory write speed. The TLB can then use rules to apply the logic described above. Process 400 stops (450).

Figure 5:
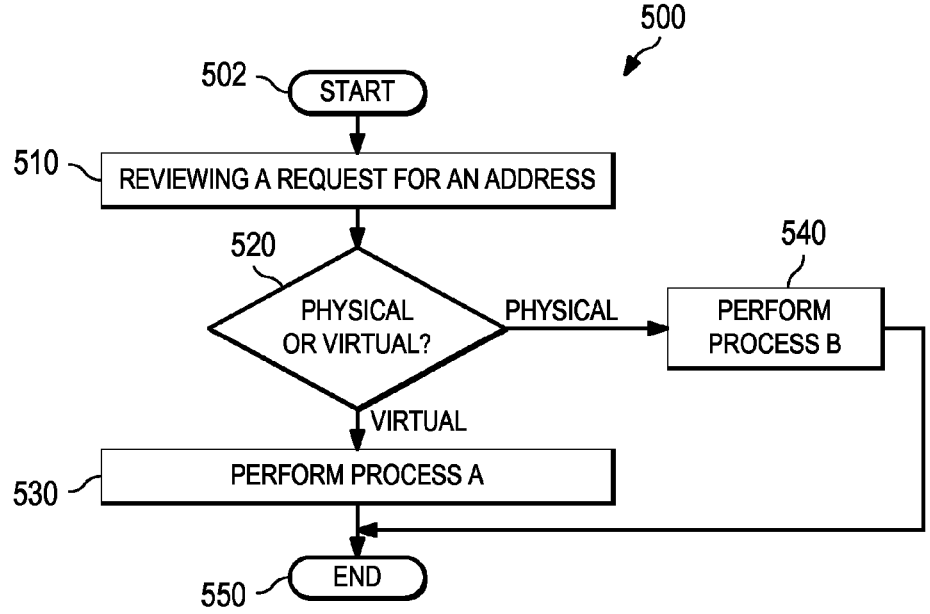
FIG. 5 is a flow chart of a memory management unit process in which illustrative embodiments may be implemented.

Referring to FIG. 5, a flow chart of a memory management unit process is depicted in which illustrative embodiments may be implemented. Process 500 starts (502) and receives a request for an address (510). Process 500 determines whether the request for an address is for a virtual address or a physical address (520). If the request is for a virtual address, process 500 invokes process 600. If the request is for a physical address, process 500 invokes process 700.

Figure 6:
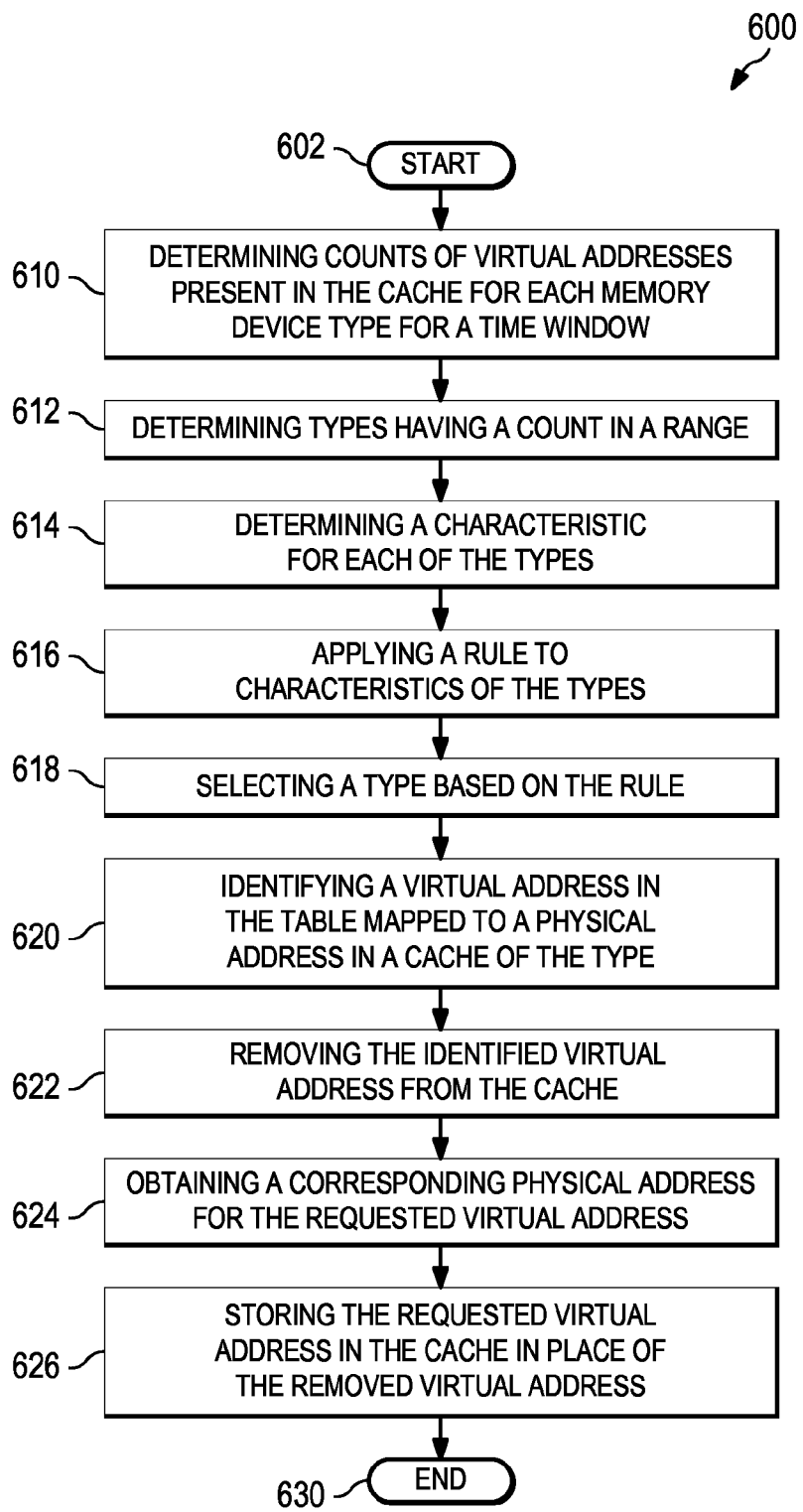
FIG. 6 is a flow chart for a virtual address process in which illustrative embodiments may be implemented.

Referring to FIG. 6, a flow chart for a virtual address process is depicted in which illustrative embodiments may be implemented. Process 600 starts (602) and determines counts of virtual addresses present in the cache table for each type of memory device for a time window (610). The cache table may be table 160 in FIG. 1 or table 300 in FIG. 3. Process 600 determines types of memory devices having a count in a range (612). In an illustrative embodiment, the types of memory devices may be memory types 330 in table 300 of FIG. 3. Process 600 determines a characteristic for each of the types (614). In an illustrative embodiment, characteristics may be memory read speed 340 and memory write speed 350 in table 300 of FIG. 3. Process 600 applies a rule to characteristics of the types (616).

Process 600 selects a type based on the rule (618). In an illustrative embodiment, where two types of memory, "A" and "B," are identified and "A" has faster read access speeds compared to B. In the last "n" units of time, the count for Memory type "A" is "x" and the count for Memory type "B" is "y". If both "x" and "y" are within a specified range "w<count<z", then the addresses corresponding to "A" can be removed ahead of "B" because "A" offers better read speeds and if required can be restored with a lesser cost later. Depending upon the types of memory devices available in any system, the window "n" within which the count is maintained can be configured.

Process 600 identifies a virtual address in the cache table mapped to a physical address in memory device of the type (620). The virtual address may be in a cache table such as table 160 in FIG. 1 or table 300 in FIG. 3. Data associated with the virtual address and may be in cache A 122 through cache D 136 and cache 207 through cache 217 in FIG. 2. The virtual address may be mapped to a physical address in a cache such as cache A 122 through cache D 136 and cache 207 through cache 217 in FIG. 2. Process 600 removes the identified virtual address from the cache table (622). Process 600 obtains a corresponding physical address for the requested virtual address (624). Process 600 stores the requested virtual address in the cache table in place of the removed virtual address (626). Process 600 stops (630).

Figure 7:
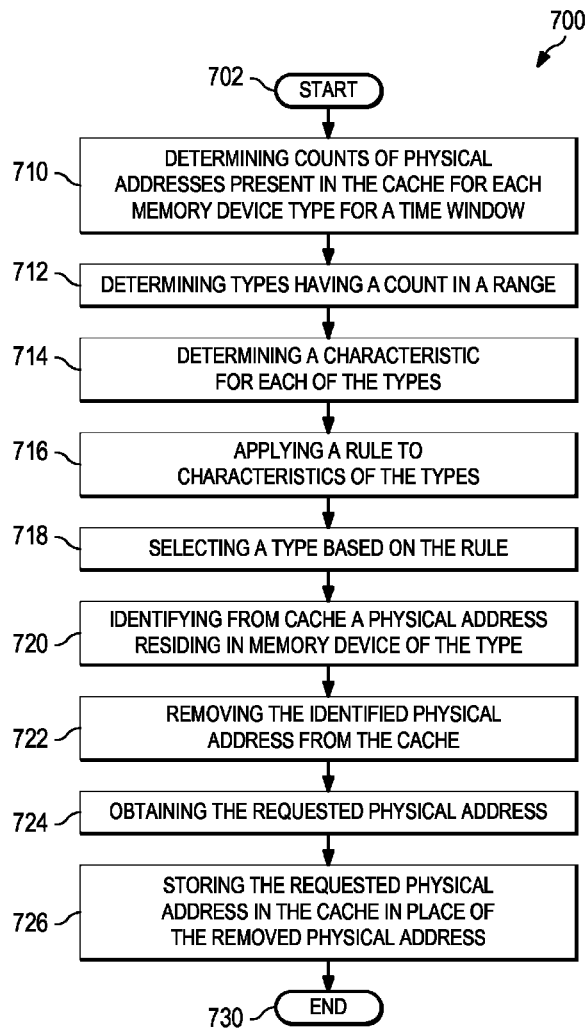
FIG. 7 is a flow chart of a physical address process in which illustrative embodiments may be implemented.

Referring to FIG. 7, a flow chart of a physical address process is depicted in which illustrative embodiments may be implemented. Process 700 starts (702). Process 700 determines counts of physical addresses present in the cache table for each memory device type for a time window (710). Process 700 determines types of memory devices having a count in a range (712). Process 700 determines a characteristic for each of the types (714).

Process 700 applies a rule to characteristics of the types (716). Process 700 selects a type based on the rule (718). In an illustrative embodiment, a rule such as discussed above in regard to FIG. 6 may be applied. Process 700 identifies a physical address in the cache table associated with data residing in a memory device of the type (720). Process 700 removes the identified physical address from the cache table (722). Process 700 obtains a requested physical address (724). Process 700 stores the requested physical address in the cache table in place of the removed physical address (726). Process 700 stops (730).

Thus, the illustrative embodiments as described herein provide an apparatus comprising a processor unit that removes, responsive to obtaining a new address, an entry from a memory of a type of memory based on a comparison of a performance of the type of memory to different performances, each of the different performances associated with a number of other types of memory. The entry may be one of a virtual address and a physical address.

The processor unit may include at least one of instructions and circuits to remove the address from the memory. The performance may comprise an access speed of the type of memory. The memory may be a translation lookaside buffer. The memory may be a cache table. The processor unit may contain one of instructions and circuits to obtain, responsive to a request for a requested virtual address that is not in the cache table, a corresponding physical address for the requested virtual address, and to store, responsive to a removal of the virtual address from the cache table by the processor unit, the requested virtual address in the cache table.

The processor unit may contain one of instructions and circuits to obtain, responsive to a request by a central processing unit for a requested physical address that is not in the cache table, the physical address, and to store, responsive to a removal of the entry from the cache table by the processor unit, the requested physical address in the cache table. The processor unit may include a memory management unit connected to at least one processor, the cache stores a number of virtual addresses each mapped to a number of corresponding physical addresses in a number of different memory devices and the number of different memory devices are of a number of types, wherein each of the number of types is different and each of the number of types has a number of different characteristics. The processor unit may further comprise a memory management unit connected to at least one processor, the cache stores a number of physical addresses corresponding to the number of memory devices and the number of memory devices are of a number of types, wherein each of the number of types is different and each of the number of types has a number of different characteristics.

In an embodiment, the memory management unit may include a hypervisor that identifies the number of memory devices, the number of types of memory devices, and for each of the number of types of memory devices determines the number of different characteristics. The processor unit may determine counts of requests for each virtual address residing in the cache table during a period of time. The processor unit may determine which virtual addresses have a count within a range. The processor unit may select, from the virtual addresses having a count within the range, a virtual address for removal from the number of virtual addresses in the cache table, wherein the virtual address is the entry.

In an embodiment, the processor unit may determine a number of counts of requests for each physical address residing in the cache table in a unit of time, determine physical addresses having counts within a range, and determines a physical address having a count within the range that is associated with data in a memory device of a type that has the characteristic.

The illustrative embodiments as described herein provide a method that includes a memory management unit in a processor unit operably coupled to at least one processor, storing in a cache table a number of virtual addresses each mapped to a number of corresponding physical addresses in a number of different memory devices and the number of different memory devices are of a number of types, wherein each of the number of types is different and each of the number of types has a number of different characteristics. The method may identify, by a hypervisor, the number of memory devices, the number of types of memory devices, and for each of the number of types of memory devices determines the number of different characteristics.

The method may determine counts of requests for each virtual address residing in the cache table during a period of time. The method may determine which virtual addresses have a count within a range. The method may select, from the virtual addresses having a count within the range, a virtual address for removal from the number of virtual addresses in the cache table, wherein the virtual address is the entry. The method may remove an entry from a cache table based on a performance of a type of memory device containing data associated with the entry. The method may further comprise an entry that may be one of a virtual address in the cache table mapped to a corresponding physical address of the data associated with the entry in a memory device of the type of memory device and a physical address of the data associated with the entry in a memory device of the type of memory device.

The illustrative embodiments as described herein provide a method that includes a memory management unit in a processor unit operably coupled to at least one processor, stores in a cache table a number of virtual addresses each mapped to a number of corresponding physical addresses in a number of different memory devices and the number of different memory devices are of a number of types, wherein each of the number of types is different and each of the number of types has a number of different characteristics, and identifies, by a hypervisor, the number of memory devices, the number of types of memory devices, and for each of the number of types of memory devices determines the number of different characteristics.

In an illustrative embodiment, a computer program product comprises one or more computer readable storage devices and program instructions stored in at least one computer readable storage device for determining counts of requests for each address residing in the cache table during a period of time, program instructions stored in at least one computer readable storage device for determining which addresses have a count within a range, program instructions stored in at least one computer readable storage device for selecting, from the addresses having a count within the range, a virtual address for removal from the number of addresses in the cache table, wherein the address is the entry; and program instructions stored in at least one computer readable storage device for removing an entry from a cache table based on a performance of a type of memory device containing data associated with the entry.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband, or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method comprising:
including a memory management unit in a processor unit operably coupled to at least one processor;
storing in a cache table entries for a number of physical addresses and a number of virtual addresses wherein each of the number of virtual addresses is mapped to only one of a number of corresponding physical addresses residing in a number of different memory devices and the number of different memory devices are of a number of types, wherein each of the number of types is different and each of the number of types has a number of different characteristics, and wherein each entry in the cache table comprises data including a virtual address and a corresponding physical address, a start address, an end address, a memory type, a memory read speed and a memory write speed;
identifying, by a hypervisor, a number of memory devices, a number of types of memory devices, and for each of the number of types of memory devices determines the number of different characteristics; and
responsive to obtaining a new address, identifying an addressing variant associated with the new address, wherein the addressing variant is one of a virtual address and a physical address, and wherein responsive to the addressing variant is the virtual address, selecting a first process and responsive to the addressing variant is the physical address, selecting a second process.

2. The method of claim 1, further comprising:
responsive to the addressing variant is the virtual address, determining, by the processor unit, counts of requests for each virtual address for each type of memory device residing in the cache table during a period of time, wherein a window "n" representing the period of time within which the counts are maintained is configurable depending upon types of memory devices available;
determining, by the processor unit, which virtual addresses and respective types of memory devices have a count within a specified range;
selecting, by the processor unit, from the virtual addresses having a count within the specified range, a virtual address for removal from the number of virtual addresses in the cache table, wherein the virtual address selected is an entry;
removing, by the processor unit, the entry from the cache table based on a performance of the type of memory device containing data associated with the entry; and
wherein the entry comprises one of a virtual address in the cache table mapped to a corresponding physical address of the data associated with the entry in a memory device of the type of memory device and a physical address of the data associated with the entry in the memory device of the type of memory device.

3. The method of claim 2, further comprising:
wherein the processor unit includes at least one of instructions and circuits to remove the entry from the cache table;
wherein the performance comprises one of an access speed, a memory read speed and a memory write speed of the type of memory device; and
wherein the cache table is a translation lookaside buffer.

4. The method of claim 2, further comprising:
wherein the number of types of memory devices include at least one of dynamic random access memory (DRAM), static random access memory (SRAM), phase change memory (PRAM), embedded dynamic random access memory (eDRAM), electrically erasable programmable read-only memory (EEPROM), NOR flash memory, and NAND flash memory;
wherein the number of different characteristics include at least one of an address range, a read speed, and a write speed, and wherein the criteria comprises one of an address range, a read speed, and a write speed; and
wherein the processor unit determines the types of memory devices for which a count of requests of virtual addresses falls within a maximum and a minimum of the specified range.

5. A method comprising:
including a memory management unit in a processor unit operably coupled to at least one processor;
storing in a cache table a number of physical addresses each mapped to only one of a number of corresponding physical addresses in a number of different memory devices and the number of different memory devices are of a number of types, wherein each of the number of types is different and each of the number of types has a number of different characteristics and wherein each entry in the cache tale comprises data including a virtual address and a corresponding physical address, a start address, an end address, a memory type, a memory read speed and a memory write speed; and
identifying, by a hypervisor, a number of memory devices, a number of types of memory devices, and for each of the number of types of memory devices determines the number of different characteristics; and
responsive to obtaining a new address, identifying an addressing variant associated with the new address, wherein the addressing variant is one of a virtual address and a physical address, and wherein responsive to the addressing variant is the virtual address, selecting a first process and responsive to the addressing variant is the physical address, selecting a second process.

6. The method of claim 5, further comprising:
responsive to the addressing variant is the physical address, determining, by a processing unit, counts of requests for each physical address residing in the cache table during a period of time, wherein a window "n" representing the period of time within which the counts are maintained is configurable depending upon types of memory devices available;
determining, by the processing unit, which physical addresses and respective types of memory devices having a count within a specified range;
selecting, by the processing unit from the physical addresses having count within the specified range for respective types of memory devices, the physical address for removal from a number of physical addresses in the cache table, wherein the physical address selected is an entry; and
removing, by the processing unit, the entry from the cache table based on a performance of the type of memory device containing data associated with the entry;
wherein a removal algorithm is modifiable by one or more selected processes from a group comprising a hypervisor and memory management unit process, a memory management unit process, a virtual address process and a physical address process;

wherein the entry comprises one of a virtual address in the cache table mapped to a corresponding physical address of the data associated with the entry in a memory device of the type of memory device and a physical address of the data associated with the entry in the memory device of the type of memory device;

wherein the processor unit includes at least one of instructions and circuits to remove the entry from the cache table;

wherein the performance comprises an access speed of the type of memory;

wherein the cache table is a translation lookaside buffer;

wherein the processor unit is included in a memory management unit connected to at least one processor, the cache table stores a number of physical addresses corresponding to the number of memory devices and the number of memory devices are of a number of types, wherein each of the number of types is different and each of the number of types has a number of different characteristics, and wherein each entry in the cache table comprises data including a virtual address and a corresponding physical address, a start address, an end address, a memory type, a memory read speed and a memory write speed;

wherein the processor unit further contains one of instructions and circuits to obtain, responsive to a request by a central processing unit for a requested physical address that is not in the cache table, and to store, responsive to a removal of the physical address from the cache table by the processor unit, the requested physical address in the cache table;

wherein the memory management unit is included in a hypervisor that identifies the number of memory devices, the number of types of memory devices, and for each of the number of types of memory devices determines the number of different characteristics;

wherein the number of types of memory devices include at least one of dynamic random access memory (DRAM), static random access memory (SRAM), phase change memory (PRAM), embedded dynamic random access memory (eDRAM), electrically erasable programmable read-only memory (EEPROM), NOR flash memory, and NAND flash memory;

wherein the number of different characteristics include at least one of an address range, a read speed, and a write speed, and wherein the criteria comprises one of an address range, a read speed, and a write speed; and wherein the processor unit determines the types of memory devices for which a count of request of physical addresses falls within a maximum and a minimum of the specified range.

* * * * *